United States Patent
Llamas et al.

(10) Patent No.: US 9,135,081 B2
(45) Date of Patent: Sep. 15, 2015

(54) WORK-QUEUE-BASED GRAPHICS PROCESSING UNIT WORK CREATION

(71) Applicant: NVIDIA Corporation, Santa Clara, CA (US)

(72) Inventors: Ignacio Llamas, Sunnyvale, CA (US); Craig Ross Duttweiler, San Carlos, CA (US); Jeffrey A. Bolz, Austin, TX (US); Daniel Elliot Wexler, Soda Springs, CA (US)

(73) Assignee: NVIDIA Corporation, Santa Clara, CA (US)

( * ) Notice: Subject to any disclaimer, the term of this patent is extended or adjusted under 35 U.S.C. 154(b) by 256 days.

(21) Appl. No.: 13/662,274

(22) Filed: Oct. 26, 2012

(65) Prior Publication Data
US 2014/0123144 A1    May 1, 2014

(51) Int. Cl.
*G06F 9/46* (2006.01)
*G06F 9/52* (2006.01)
*G06F 9/54* (2006.01)

(52) U.S. Cl.
CPC *G06F 9/52* (2013.01); *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 2006/0132491 A1* | 6/2006 | Riach et al. | 345/505 |
| 2012/0188263 A1* | 7/2012 | Becchi et al. | 345/543 |
| 2014/0055467 A1* | 2/2014 | Bittner et al. | 345/520 |

* cited by examiner

*Primary Examiner* — Sisley Kim
(74) *Attorney, Agent, or Firm* — Artegis Law Group, LLP

(57) ABSTRACT

One embodiment of the present invention enables threads executing on a processor to locally generate and execute work within that processor by way of work queues and command blocks. A device driver, as an initialization procedure for establishing memory objects that enable the threads to locally generate and execute work, generates a work queue, and sets a GP_GET pointer of the work queue to the first entry in the work queue. The device driver also, during the initialization procedure, sets a GP_PUT pointer of the work queue to the last free entry included in the work queue, thereby establishing a range of entries in the work queue into which new work generated by the threads can be loaded and subsequently executed by the processor. The threads then populate command blocks with generated work and point entries in the work queue to the command blocks to effect processor execution of the work stored in the command blocks.

20 Claims, 15 Drawing Sheets

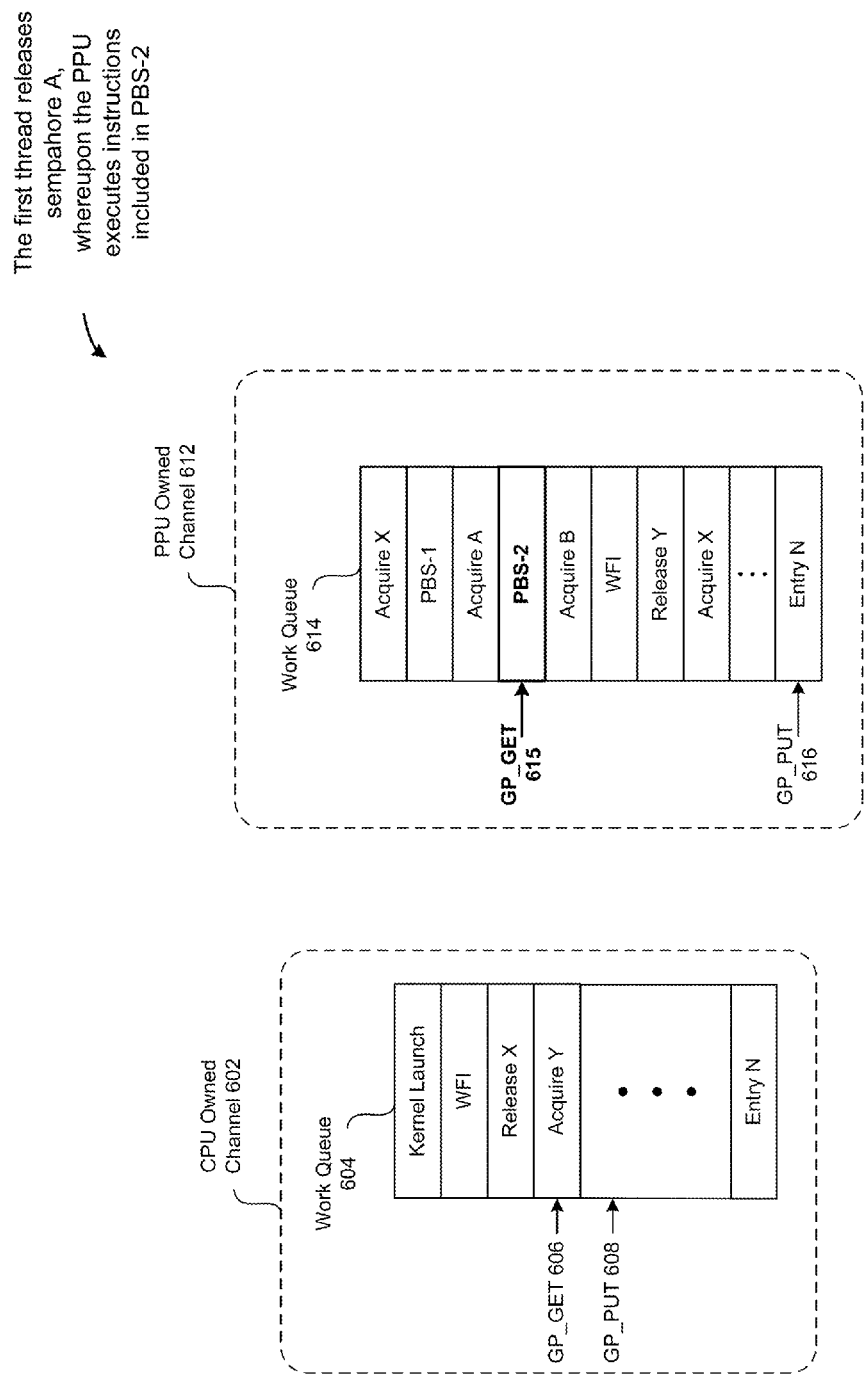

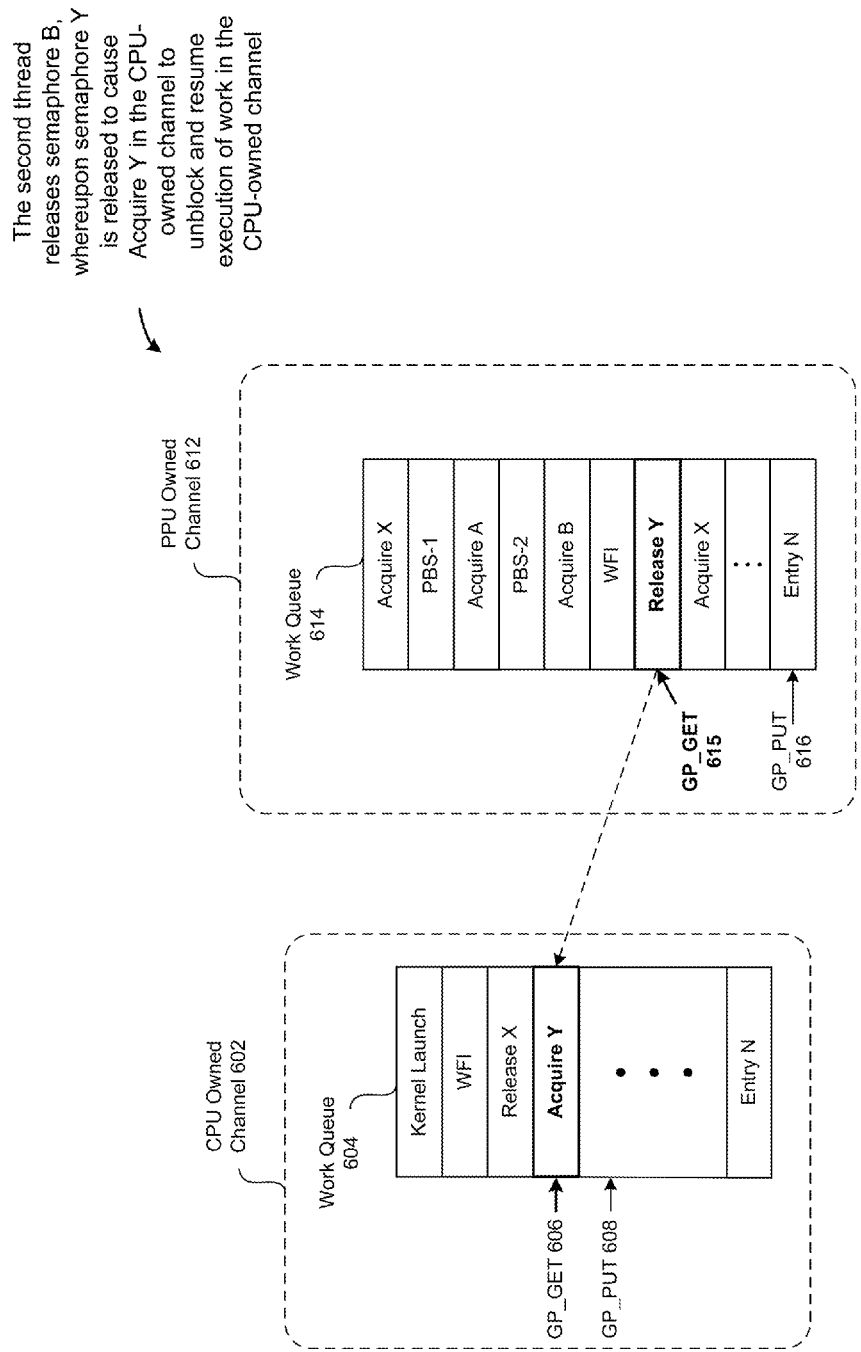

WORK-QUEUE-BASED GRAPHICS PROCESSING UNIT WORK CREATION

BACKGROUND OF THE INVENTION

1. Field of the Invention

The present invention generally relates to computer processing, and, more specifically, to enabling local generation of work within a graphics processing unit (GPU).

2. Description of the Related Art

Graphics processing units (GPUs) are designed to process a variety of intensive tasks within a computing system, such as graphics processing work and compute application work. In a typical configuration, a central processing unit (CPU) generates GPU-based work and loads the GPU-based work into a global memory that is accessible to both the CPU and the GPU. The CPU then accesses a work queue of the GPU—often referred to as a "channel"—through which the CPU is able to cause the GPU to process the GPU-based work stored in the global memory.

In one configuration, the processing activity of the GPU is controlled by the manipulation of two separate pointers that each refer to an entry in the work queue, referred to herein as the GP_GET pointer and the GP_PUT pointer. The GP_GET pointer points to a particular entry in the work queue and indicates to the CPU how far along the GPU is in executing the work stored in the work queue. Alternatively, the GP_PUT pointer points to the entry in the work queue right after the last entry written by the CPU. When the GPU completes execution of GPU-based work pointed to by a given work queue entry, the GPU increments GP_GET. Notably, when GP_GET reaches the entry count of the work queue, GP_GET is reset to a value of zero, since the work queue is circular. If, after being incremented, GP_GET is equal to GP_PUT, then no more entries in the work queue remain to be processed. Otherwise, the GPU executes the work pointed to by GP_GET. Also, If GP_GET is equal to "(GP_PUT+1) modulo 'number of entries in the work queue'", then the work queue is considered as full. As long as the work queue is not full, the CPU can increment the GP_PUT pointer in order to submit new entries written in the work queue for GPU processing. The GPU monitors changes to GP_PUT performed by the CPU, such that the CPU-submitted work queue entries are processed in a timely manner.

In many cases, it is desirable to enable the GPU to generate additional (i.e., nested) work that can be loaded into the work queue by the GPU and processed by the GPU. Unfortunately, specific hardware limitations exist between popular CPU-to-GPU communication channels—such as Peripheral Component Interconnect Express (PCI-E)—and prevent the GPU from being able to modify the GP_PUT pointer, which, as described above, needs to be incremented after inserting new work into the work queue. As a result, the GPU must rely on the CPU to generate and execute nested work, which is inefficient in comparison to locally generating and executing nested work within the GPU.

Accordingly, what is needed in the art is a technique for enabling a GPU to locally-generate work in the presence of CPU-to-GPU communication channel hardware limitations.

SUMMARY OF THE INVENTION

One embodiment of the present invention sets forth a method for configuring a work queue to enable threads executing in a parallel processing subsystem to generate and execute work within the parallel processing subsystem. The method includes the steps of generating the work queue, wherein the work queue includes a plurality of entries and is associated with a first pointer and a second pointer, wherein each of the first pointer and the second pointer is inaccessible to the threads, establishing a range of free entries in the work queue by: pointing the first pointer to a first entry of the plurality of entries, and pointing the second pointer to a last entry of the plurality of entries, generating a third pointer that points to the first entry of the plurality of entries, wherein the third pointer is accessible to the threads, generating a fourth pointer that points to the last entry of the plurality of entries, wherein the fourth pointer is accessible to the threads, pointing the first entry of the work queue to a command block that contains a semaphore acquire command pointing to a semaphore that is blocked, loading work into the work queue via the third and fourth pointers, determining that the threads have completed loading work, and releasing the semaphore to cause both the first pointer to advance to a next entry in the work queue and to cause the parallel processing subsystem to execute work generated by the threads.

One advantage of the disclosed embodiments of the present invention is that they enable threads executing on the processing unit to create nested work within the processing unit without needing to issue requests to a CPU to do so. As a result, less bandwidth is consumed across the communication path between the CPU and processing unit, and, further, the workload of the CPU is reduced, thereby increasing efficiency. Moreover, the threads are capable of executing useful nested work without relying on the CPU for authorization or having to wait for the CPU to respond to a request to submit the generated nested work to the GPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-6F illustrate an example interaction between two different channels that enable work to be locally generated and executed within one of the parallel processing subsystems of the computer system of FIG. 1, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
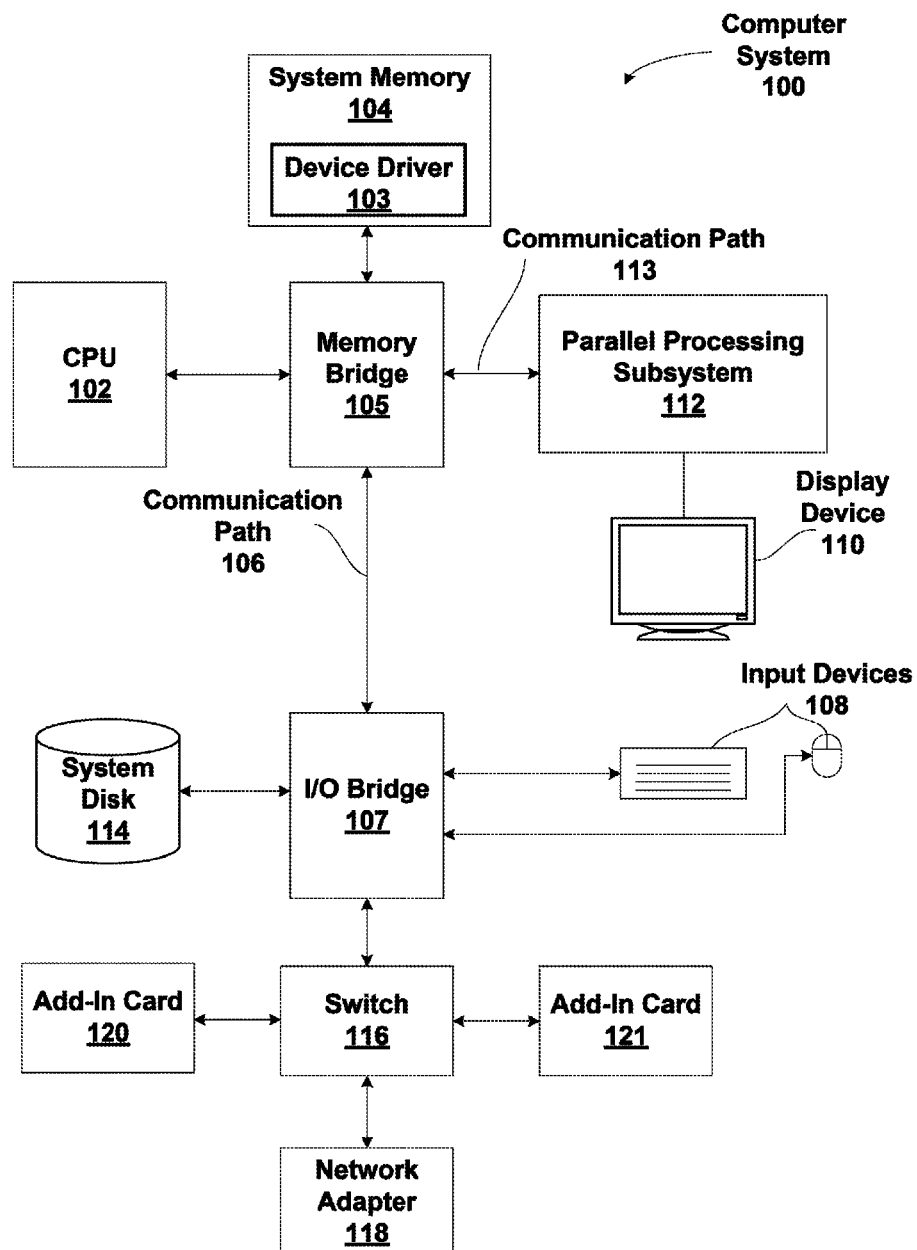
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
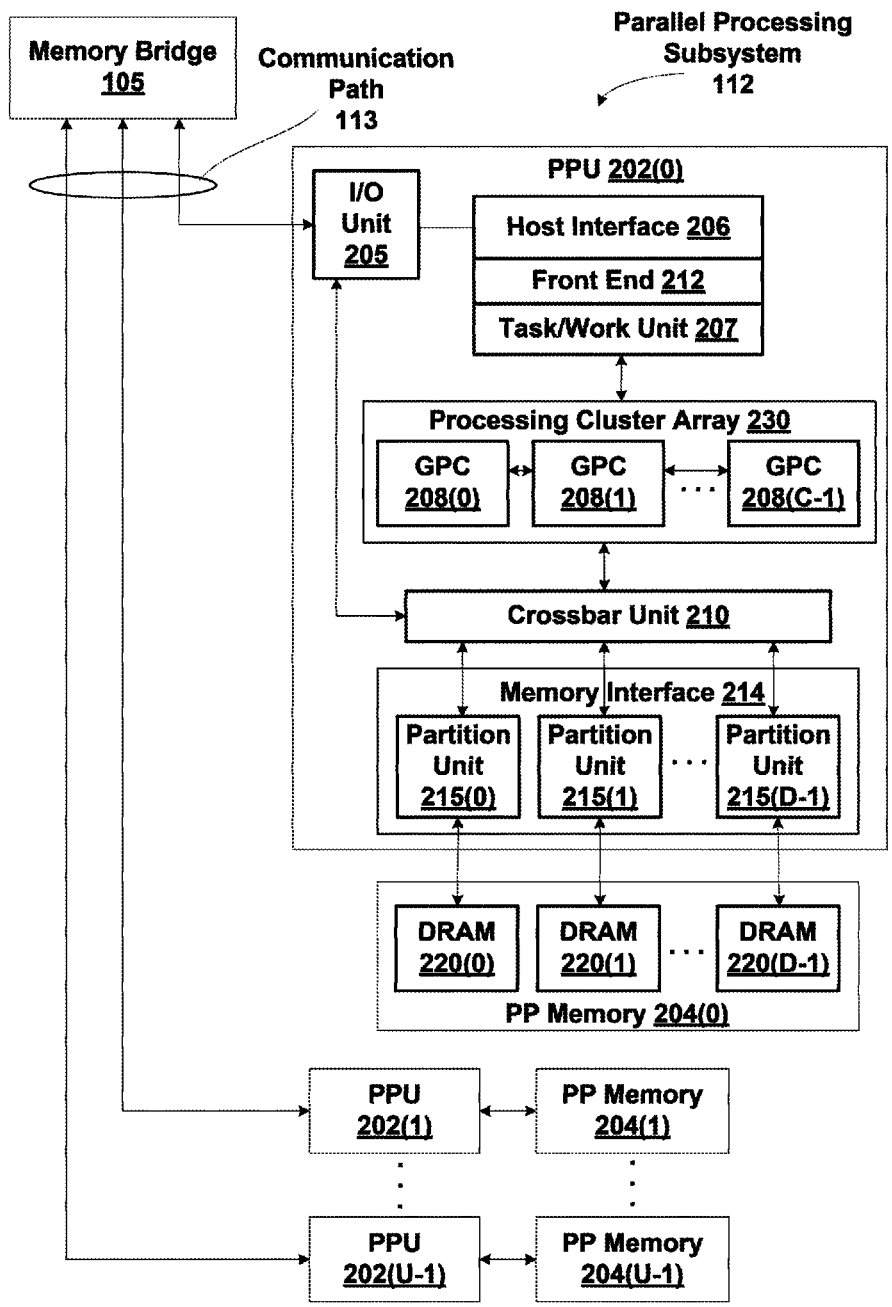
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a work queue to initiate processing of the stream of commands in the data structure. The PPU 202 reads command streams from one or more work queues and then executes commands asynchronously relative to the operation of CPU 102. Execution priorities may be specified for each work queue by an application program via the device driver 103 to control scheduling of the different work queues.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each work queue and outputs the command stream stored in the work queue to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a work queue and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
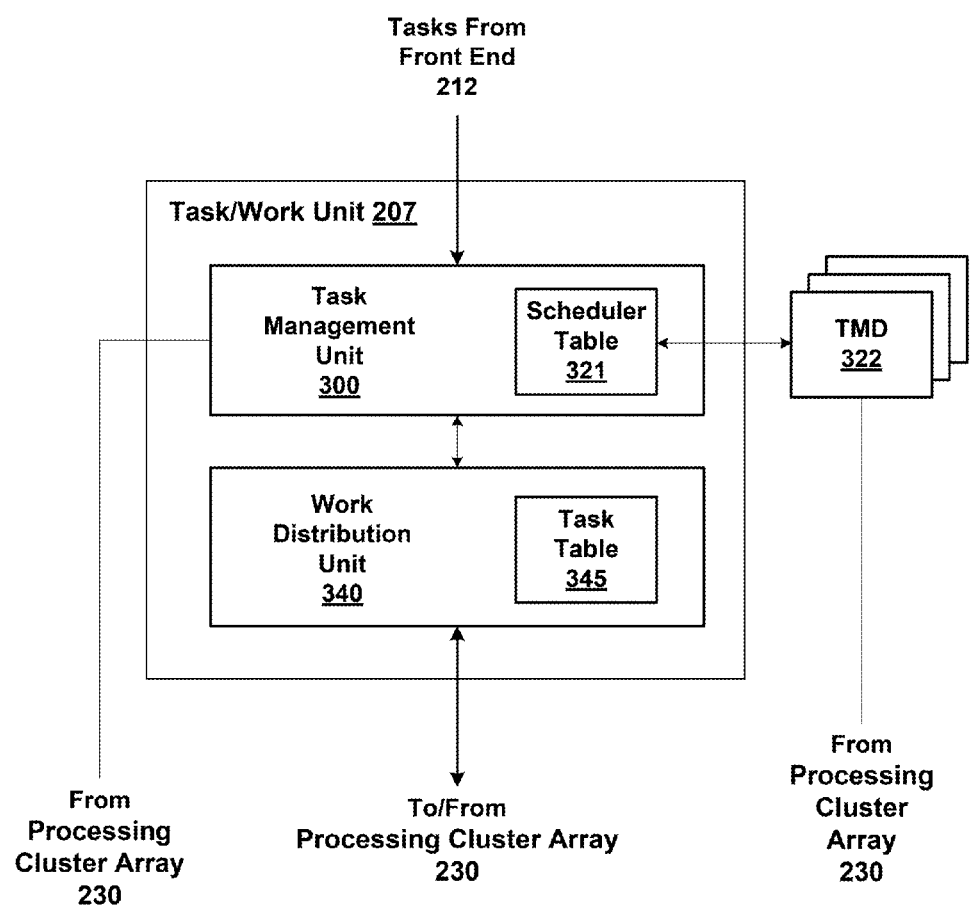
FIG. 3A is a block diagram of the Task/Work Unit of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into work queues or transmitted to the front end. The CPU 102 is not notified when a child task is generated or data for the child task is stored in memory. Another difference between the tasks that are provided through work queues and child tasks is that the tasks provided through the work queues are defined by the application program whereas the child tasks are dynamically generated during execution of the tasks.

Task Processing Overview

Figure 3B:
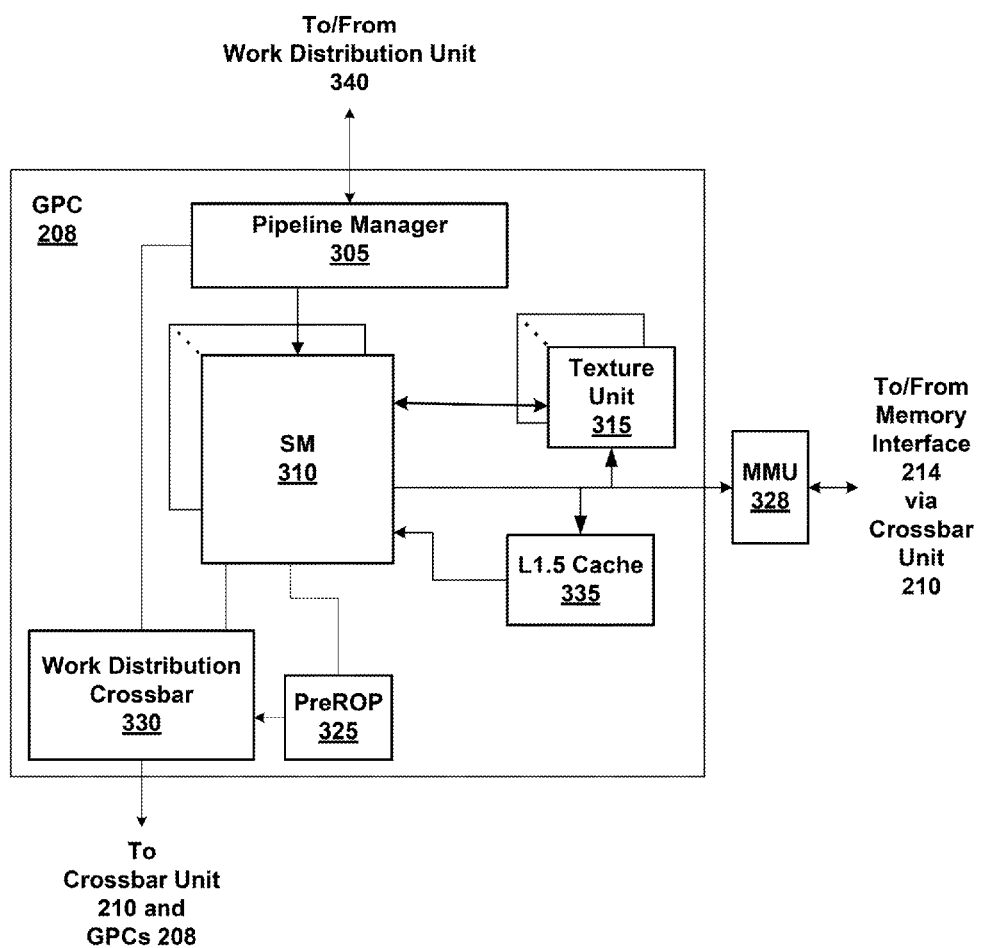
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where $M \geq 1$, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
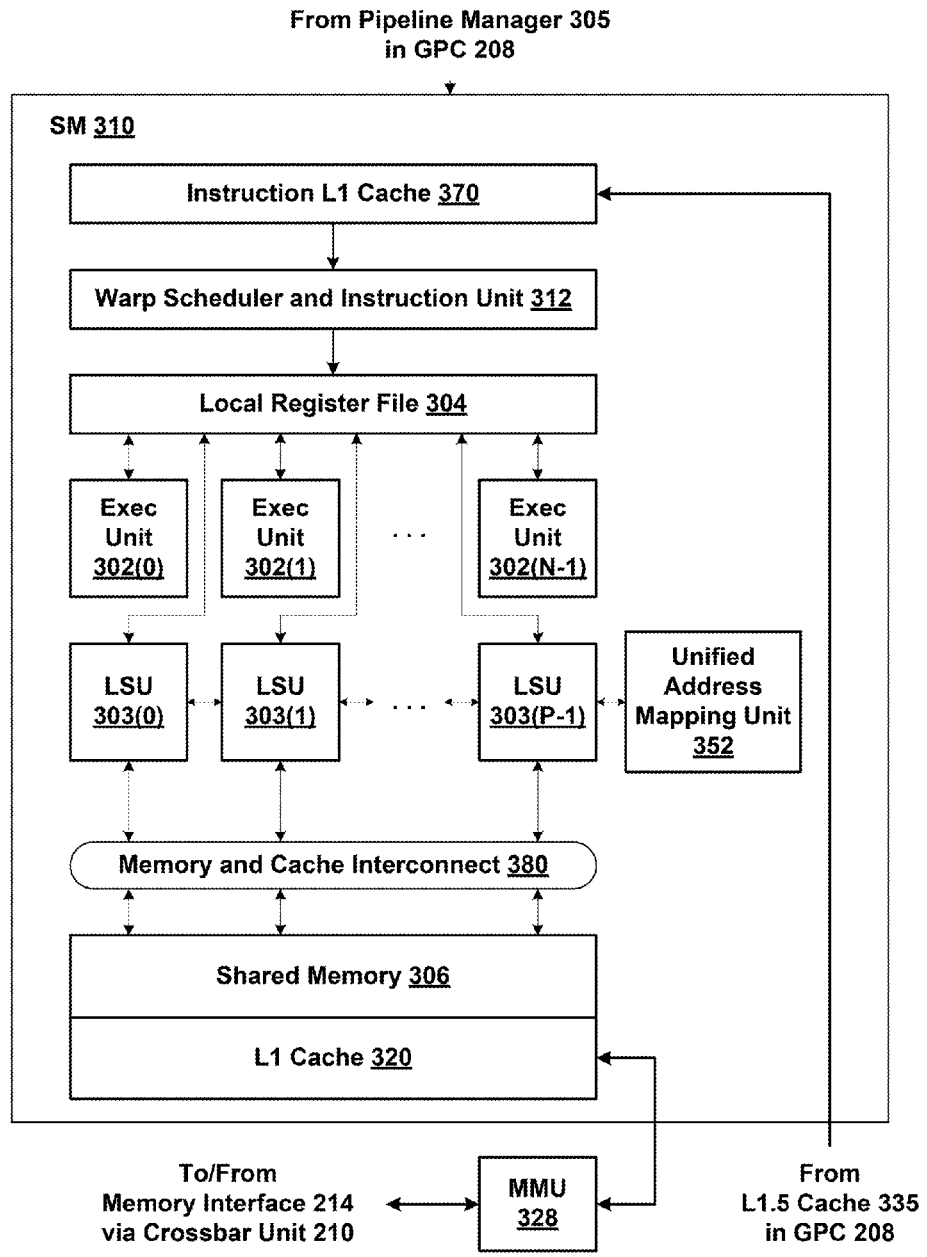
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Work-Queue-Based GPU Work Creation

As set forth in greater detail herein, the present invention enables threads executing on a PPU 202 to locally generate and execute work within that PPU 202 by way of work queues and command blocks. In one embodiment, device driver 103, as an initialization procedure for establishing memory objects that enable the threads to locally generate and execute work, generates a PPU 202-owned work queue, and sets a GP_GET pointer of the PPU 202-owned work queue to a first entry included the PPU 202-owned work queue. Device driver 103 also, during the initialization procedure, sets a GP_PUT pointer of the PPU 202-owned work queue to a last entry included in the PPU 202-owned work queue, thereby establishing a range of entries in the PPU 202-owned work queue into which new work generated by the threads can be loaded and subsequently executed by the PPU 202. A detailed description of the initialization procedure is provided below in conjunction with FIG. 4A.

To organize the manner in which the GP_GET pointer advances through the PPU 202-owned work queue—which, as set forth herein, controls what PPU-generated work is executed by the PPU 202—embodiments of the invention employ the use of semaphores, which are objects stored in global memory accessible to both the CPU 102 and the PPU 202, e.g., the PP memory 204. As is described in further detail below, commands to Acquire or Release semaphores are inserted, based on the work generated by the threads executing locally on PPU 202, into different command blocks pointed to by entries of the work queue in order to establish a controlled schedule by which the PPU 202 executes the locally-generated work. A detailed description of how the threads insert work into the work queue is described below in conjunction with FIGS. 4B-4C.

Figure 4A:
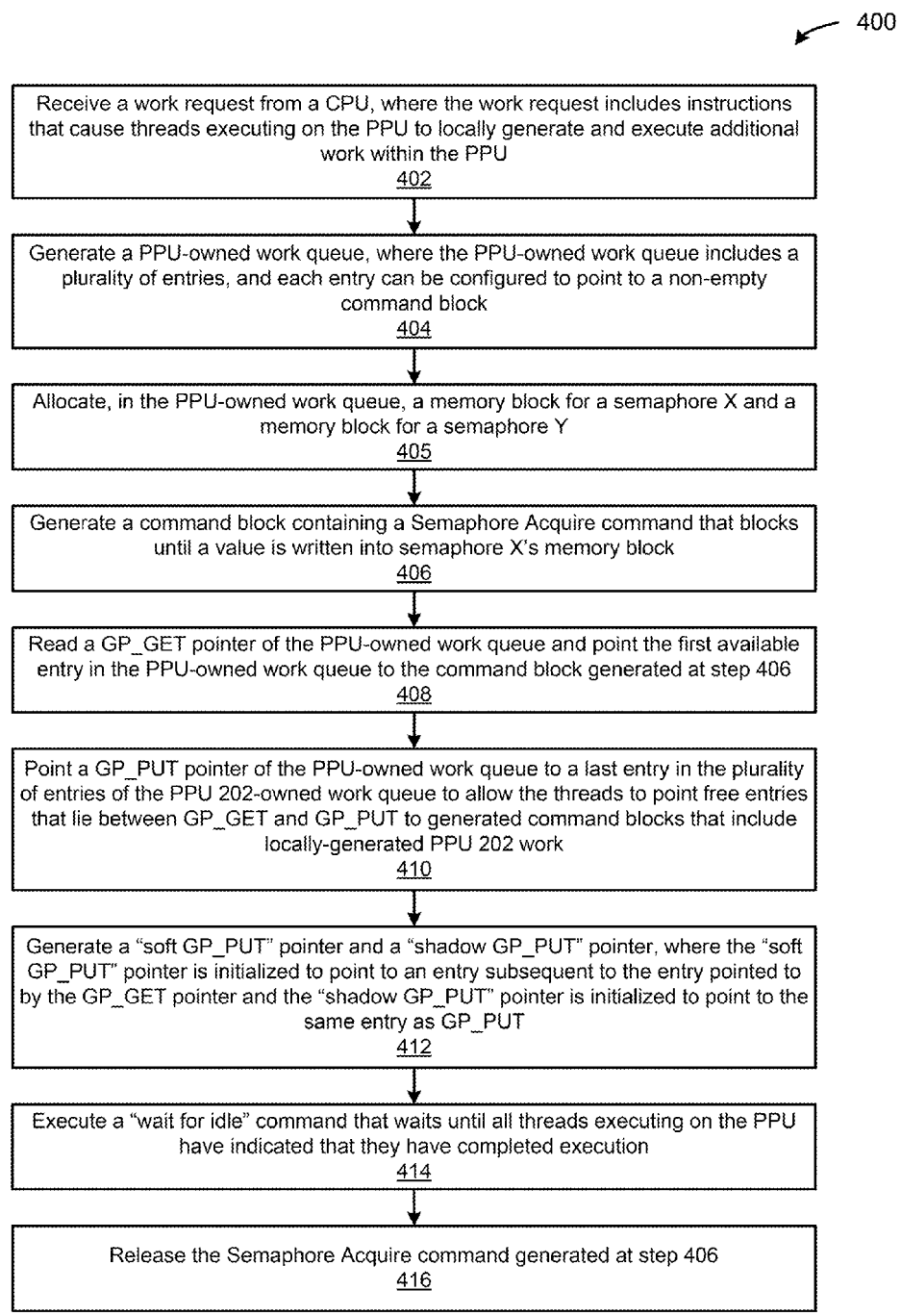
FIG. 4A illustrates a method for initializing a work queue that enables threads executing on one of the parallel processing subsystems for the computer system of FIG. 1 to locally generate work, according to one embodiment of the present invention.

FIG. 4A illustrates a method 400 for initializing a work queue that enables threads executing on one of the PPUs 202 of FIG. 2 to locally generate work, according to one embodiment of the present invention. To provide clarity, the description of method 400 included below includes references to FIGS. 5 and 6A-6F, which illustrates example contents of and relationships between various memory objects that are discussed throughout method 400. Although the method steps are described in conjunction with the systems of FIGS. 1, 2, 3A, 3B, and 3C, persons of ordinary skill in the art will understand that any system configured to perform the method steps, in any order, is within the scope of the invention.

As shown, the method 400 begins at step 402, where device driver 103 receives a work request while executing on CPU 102, and the work request includes instructions that cause threads executing on the PPU 202 to locally generate and execute additional work within the PPU 202. In one embodiment, the work request references functions within a particular application programming interface (API) supported by device driver 103 that enables a developer to indicate to the device driver 103 that the work request, when executed, will cause one or more threads executing on the PPU 202 to locally generate additional (i.e., nested work) to be executed by the PPU 202. In this way, device driver 103 is caused to set up the work queue according to steps 404-416 described below.

At step 404, device driver 103 generates a PPU 202-owned work queue, where the PPU 202-owned work queue includes a plurality of entries, and each entry can be configured to point to a non-empty command block. An example of the PPU 202-owned work queue is illustrated as work queue 504 in FIG. 5, which includes a plurality of entries 506. At step 405, the device driver 103 also allocates two memory blocks in the PPU 202-owned work queue: one for a semaphore X and one for a semaphore Y—which are referenced in semaphore Acquire and Release commands in FIGS. 6A-6F—and initializes the semaphore X and the semaphore Y to zero. For each work request received at step 402, the device driver 103 generates command blocks that contain: "Kernel Launch," "Wait for Idle," "Semaphore Release X," and "Semaphore Acquire Y" commands, and points one or more entries in a CPU-owned channel (e.g., the CPU-owned channel 602 illustrated in FIG. 6) to these generated command blocks, as illustrated in FIGS. 6A-6F and described in further detail below.

Figure 5:
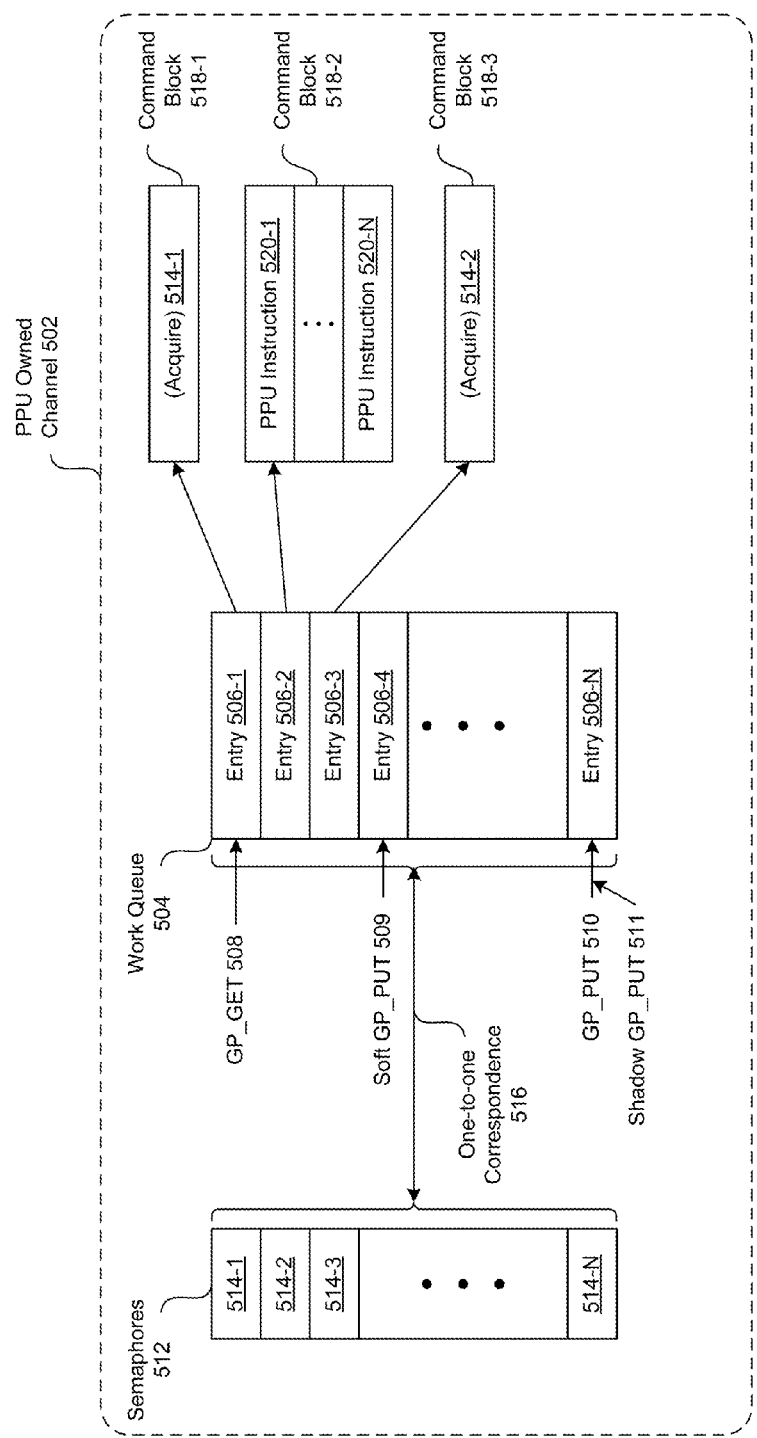
FIG. 5 illustrates an example block diagram of various memory objects configured to store work that is locally generated within one of the parallel processing subsystems of the computer system of FIG. 1, according to one embodiment of the present invention.

At step 406, device driver 103 generates a command block containing a Semaphore Acquire command that blocks until a value is written into semaphore X's memory block. In this way, the GP_GET pointer, which points indirectly to the Semaphore Acquire command, prevents the host interface 206 from incrementing the GP_GET pointer until semaphore X is unblocked. An example of this command block is illustrated in FIG. 5 as command block 518-1, where the first the Semaphore Acquire command in command block 518-1 is directed to a semaphore 514-1, which exists at a particular area of memory. The Semaphore Acquire command blocks the Host Interface 206 until a value is written into that area of memory (i.e., the semaphore is released). In one embodiment, multiple semaphores are organized into a data object that includes the same number of entries as the PPU 202-owned work queue, which is illustrated in FIG. 5 as semaphores 512. Also shown in FIG. 5 is a one-to-one correspondence 516 that exists between the semaphore entries 514 of semaphores 512 and the entries 506 of the work queue 504.

As described herein, the GP_GET pointer is the index of the first available entry of the plurality of entries of the PPU 202-owned work queue. At step 408, device driver 103 reads the GP_GET pointer of the PPU-owned work queue (e.g., the PPU-owned channel 612 of FIG. 6B) and points the first available entry in the work queue to the command block generated at step 406. This is illustrated in FIG. 6B as GP_GET 615 pointing to the first entry of work queue 614. At step 410, device driver 103 points the GP_PUT pointer to a last entry in the plurality of entries of the PPU 202-owned work queue to allow the threads to point free entries that lie between GP_GET and GP_PUT to generated command blocks that include locally-generated PPU 202 work. In one embodiment, the GP_PUT pointer is pointed to the return value produced by the function "wrap(GP_GET−1, work_queue_entry_count)," where work_queue_entry_count represents the total number of entries in the work queue. In one embodiment, the wrap( ) function is executed in a manner that is based upon the number of entries in the work queue. More specifically, if the value of work_queue_entry_count is not a power of two, then the wrap( ) function is executed as follows:

```
int wrap(int x, int work_queue_entry_count) {
    if (x < 0) { return x + work_queue_entry_count; }
    else if (x >= work_queue_entry_count { return x − work_queue_entry_count; }
    else { return x; }
}
```

Otherwise, if the value of work_queue_entry_count is a power of two, then the wrap( ) function is executed as follows:

```
int wrap(int x, int log2_pushbbufer_entry_count) {
    return (x & ((1 << log2_pushbbufer_entry_count) − 1));
}
```

Due to limitations in the PCI Express specification, the values of GP_GET and GP_PUT for any channel are not accessible to the threads running on the PPU 202. As a result, the threads have no way of adding work into the PPU 202-owned work queue by manipulating these values. To cure this deficiency, a method by which the threads are able to concurrently add work into the work queue in a controlled manner is described at step 412. In this step, device driver 103 generates a "soft GP_PUT" pointer and a "shadow GP_PUT" pointer, where the "soft GP_PUT" pointer is initialized to point to an entry subsequent to the entry pointed to by the GP_GET pointer of the PPU-owned work queue, and the "shadow GP_PUT" pointer is initialized to point to the same entry as GP_PUT pointer of the PPU-owned work queue. Unlike the GP_GET pointer and the GP_PUT pointers, both the "soft GP_PUT" pointer and the "shadow GP_PUT" pointer are accessible to the threads. In this manner, the threads can atomically update and read the "soft GP_PUT" pointer and the "shadow GP_PUT" pointer to determine the next available entry the PPU 202-owned work queue into which new work can be inserted.

At step 414, host interface 206 executes the "Wait for Idle" command inserted at step 404, waiting until all the threads executing on PPU 202 have indicated that they have completed execution, including all the memory transactions they generated. This step, illustrated in FIG. 6A as a WFI command, prevents GP_GET 606 from being incremented until the threads have completed. Upon receiving such indication, method 400 proceeds to step 416, where host interface 206 executes a Semaphore Release command, which releases the semaphore generated at step 406 to cause the PPU-generated work in the PPU 202-owned work queue to begin executing.

An example illustration of what occurs after the host interface 206 releases the semaphore is described below in conjunction with FIGS. 6C-6F.

Figure 4B:
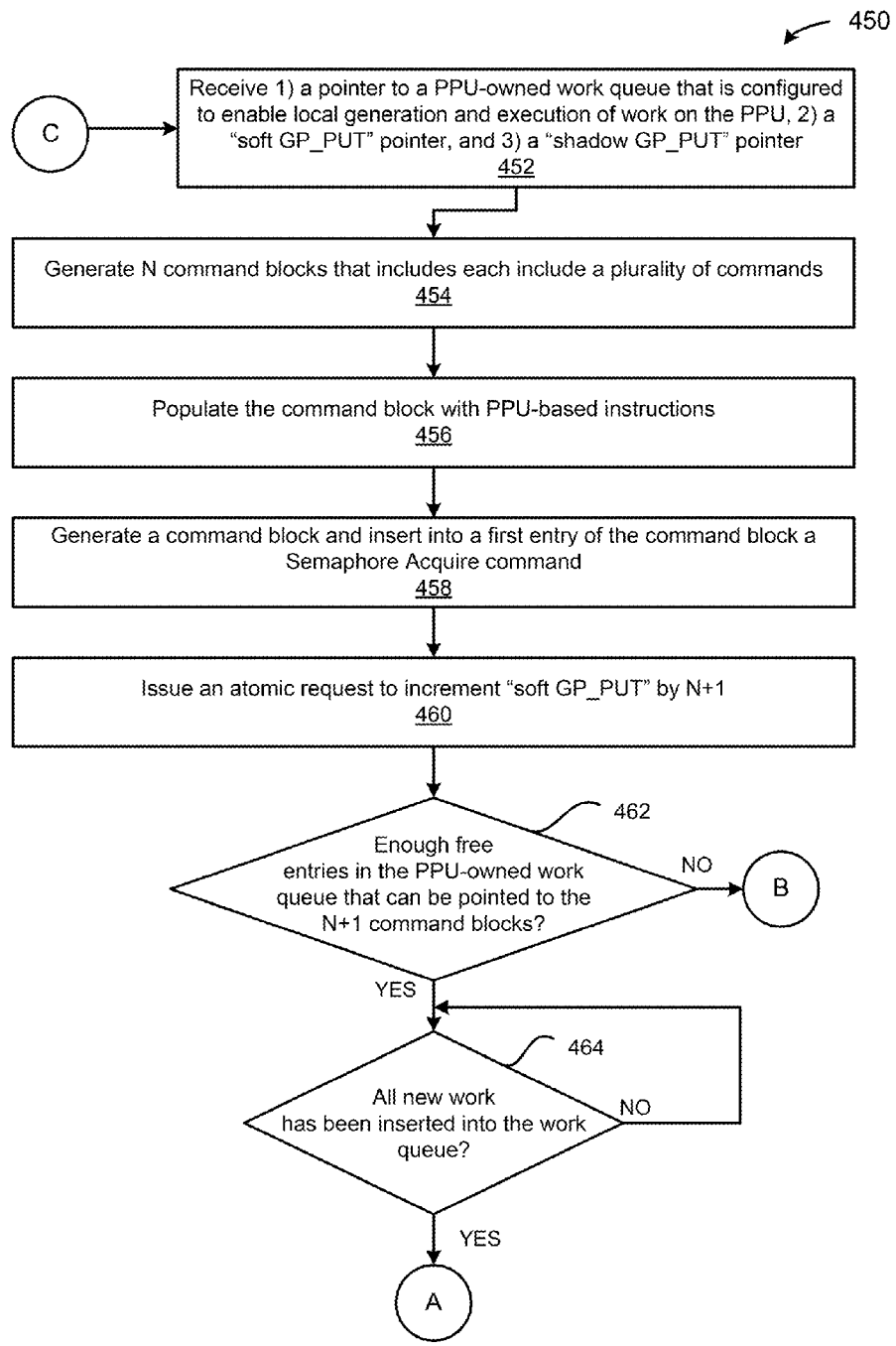
FIGS. 4B-4C illustrate a method for locally generating work by way of a thread executing on one of the parallel processing subsystems for the computer system of FIG. 1, according to one embodiment of the present invention.
Figure 4C:
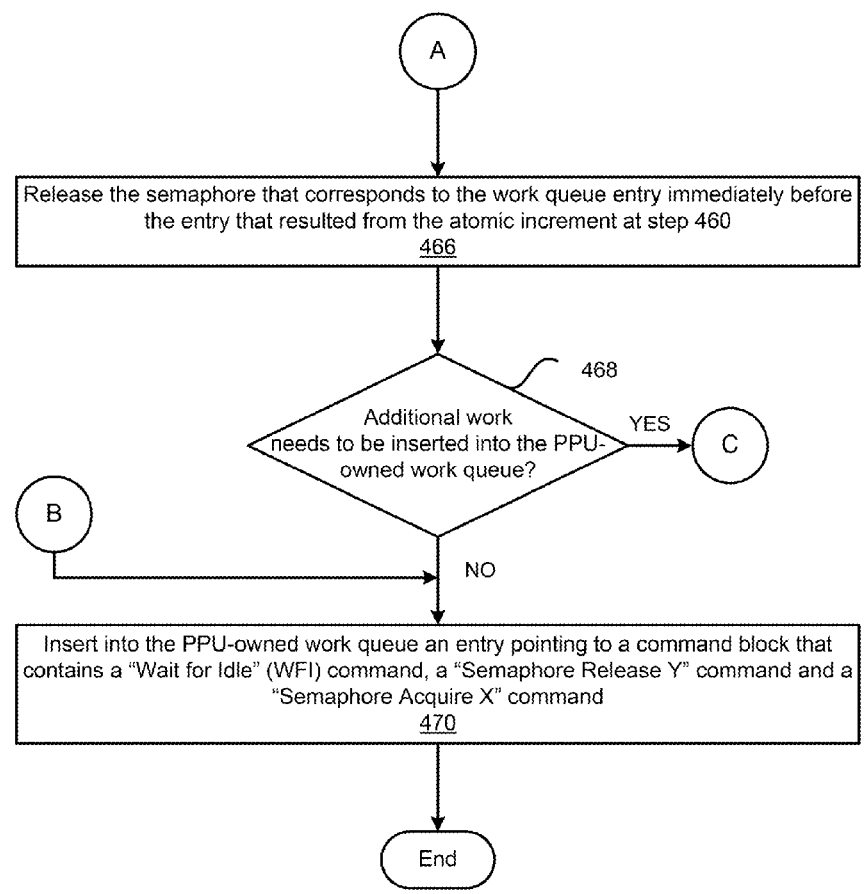

FIGS. 4B-4C illustrate a method 450 for locally generating work by way of a thread executing on one of the parallel processing subsystems for the computer system of FIG. 1, according to one embodiment of the present invention. To provide clarity, the description of method 450 included below includes references to FIGS. 5 and 6A-6F, which illustrate example contents of and relationships between various memory objects that are discussed throughout the method 450. Although the method steps are described in conjunction with the systems of FIGS. 1, 2, 3A, 3B, and 3C, persons of ordinary skill in the art will understand that any system configured to perform the method steps, in any order, is within the scope of the invention.

As shown, method 450 begins at step 452, where a thread executing within one of the PPUs 202 receives 1) a pointer to a PPU 202-owned work queue—which is generated by the device driver 103 according to step 404 of FIG. 4A—that is configured to enable local generation and execution of work on the PPU 202, 2) a "soft GP_PUT" pointer—which is also generated by the device driver 103 according to step 412 of FIG. 4A—and 3), a "shadow GP_PUT" pointer—which is further generated by the device driver 103 according to step 412 of FIG. 4A.

At step 454, the thread generates N command blocks, each including a plurality of commands. An example of such a command block is illustrated in FIG. 5 as command block 518-2, which includes a plurality of PPU-based commands 520 generated by a thread. At step 456, the thread populates the command block with PPU 202-based instructions.

At step 458, the thread generates another command block and it inserts a Semaphore Acquire command in into a first entry of the command block. This command, when later executed by host interface 206, will cause it to block until a value is written into the area of memory corresponding to the semaphore. An example of such a single-entry command block is illustrated as command block 518-3 in FIG. 5. At step 460, the thread issues an atomic request to increment "soft GP_PUT" by N+1. The value returned by the atomic increment request is used as the index of the first entry in a sequence of N+1 entries in the PPU 202-owned worked queue that have been allocated for the thread's work (N entries that will be used to point to the command blocks generated in step 454 and one that will be used to point to the command block generated in step 458).

At step 462, the thread determines whether there are enough free entries available in the PPU 202-owned work queue that can be pointed to the N+1 command blocks generated at steps 454 and 458, respectively. In one embodiment, this determination is made by comparing the value returned by the atomic increment request of step 460 against the "shadow GP_PUT" pointer to ensure that the addition of "soft GP_PUT" plus N+1 does not exceed the "shadow GP_PUT" pointer, which indicates that there is are enough free entries available in the PPU 202-owned work queue. The thread then points the N entries in the PPU-owned work queue to the command blocks generated in step 454, and, further, points the last of the N+1 allocated entries in the PPU 202-owned work queue to point to the command block with the Semaphore Acquire command generated at step 458.

At step 464, the thread determines whether all of the new work generated by the thread has been fully inserted into the PPU-owned work queue. When all of the new work has, in fact, been fully inserted into the work queue, then at step 466, the thread releases the semaphore that corresponds to the work queue entry immediately before the entry that resulted from the atomic increment at step 460. The semaphore release in this case is performed by writing to the semaphore's memory block the value for which the corresponding Semaphore Acquire command is configured to wait. This will allow the execution by Host Interface 206 of the work (commands) included in the command blocks generated by the thread in steps 454 and 458 as soon as the host interface 206 can schedule them. This will only happen after execution of all command blocks inserted in the work queue before those generated by the thread in steps 454 and 458, which may include Semaphore Acquire commands, such as those inserted in step 458 or in step 406, that would be preventing host interface 206 from making forward progress, pending their release. An example scenario of step 464 is illustrated in FIGS. 6D and 6E.

At step 468, the thread determines, by means of application-specific logic, if any additional work needs to be inserted into the PPU 202-owned work queue. If so, then method 450 proceeds to step 470, where the thread inserts into the PPU 202-owned work queue an entry pointing to a command block that contains a "Wait for Idle" (WFI) command, a "Semaphore Release Y" command and a "Semaphore Acquire X" command, following the approach described in steps 454 through 464. When host interface 206 executes these commands, first, the "Wait for Idle" command guarantees that all work in the PPU-owned channel 612 (also known as PPU-202 owned work queue) has completed, second, the "Semaphore Release Y" command writes a value into semaphore Y's memory block that unblocks any work on the CPU-owned work queue that was blocked by the "Semaphore Acquire Y" command generated at step 404. Finally, the "Semaphore Acquire X" command blocks further progress by host interface 206 while processing PPU Owned Channel 612. An example scenario of this event is illustrated in FIG. 6F.

Figure 6A:
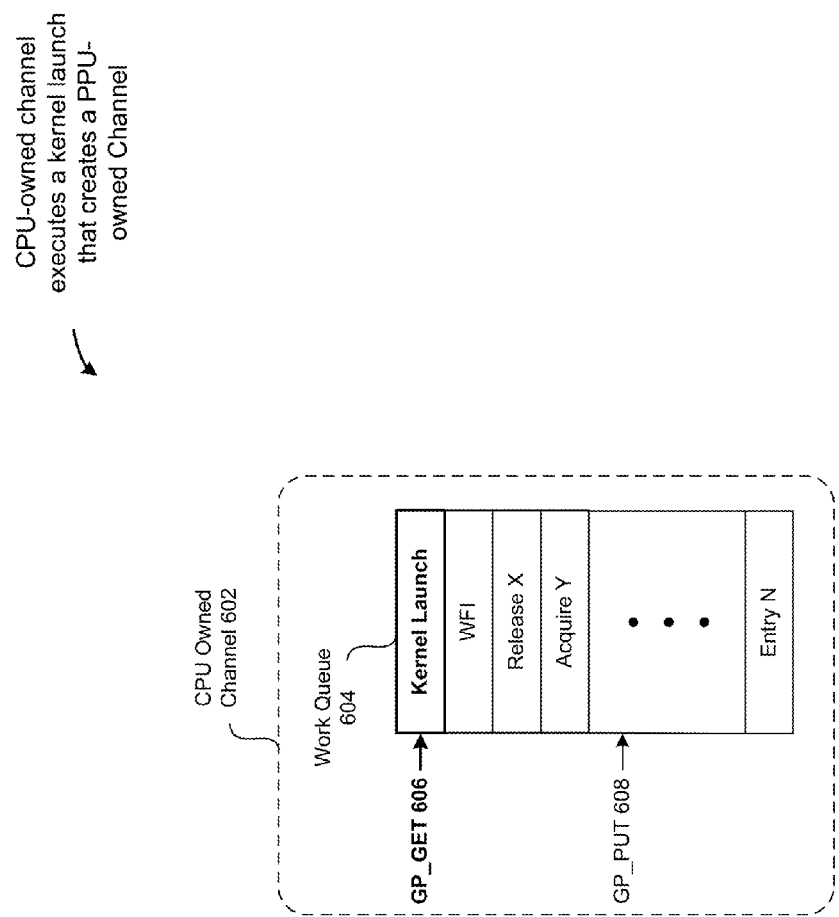
Figure 6B:
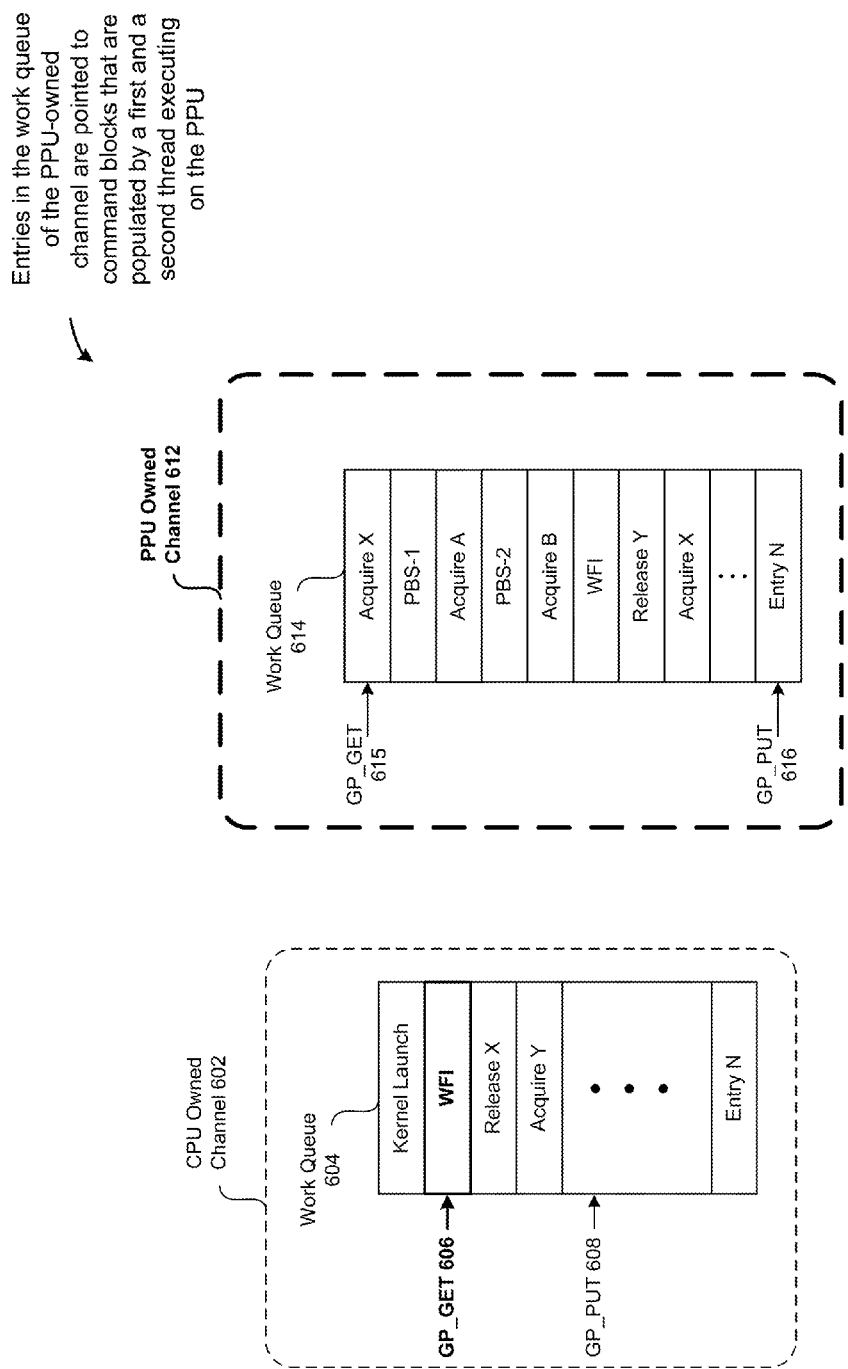
Figure 6C:
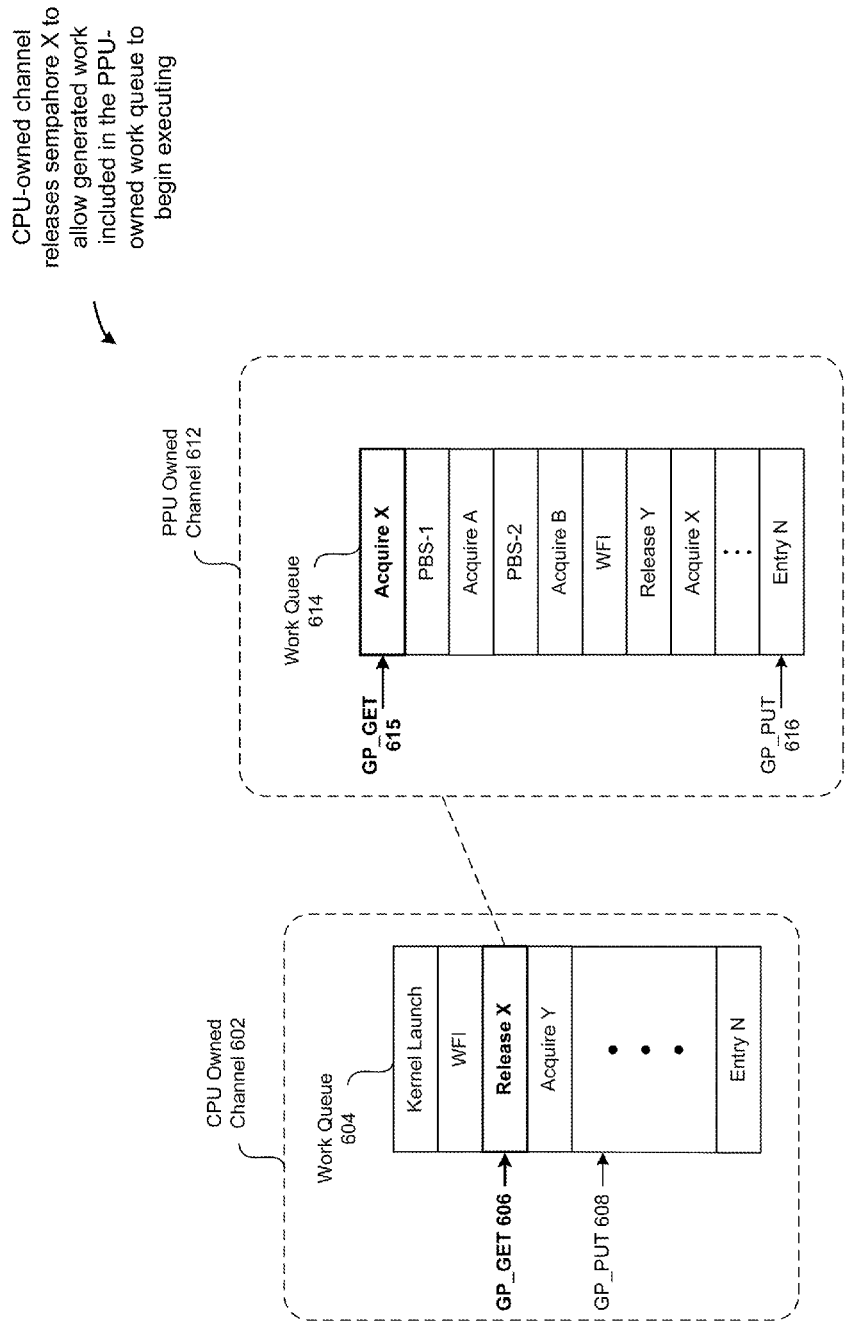
Figure 6D:
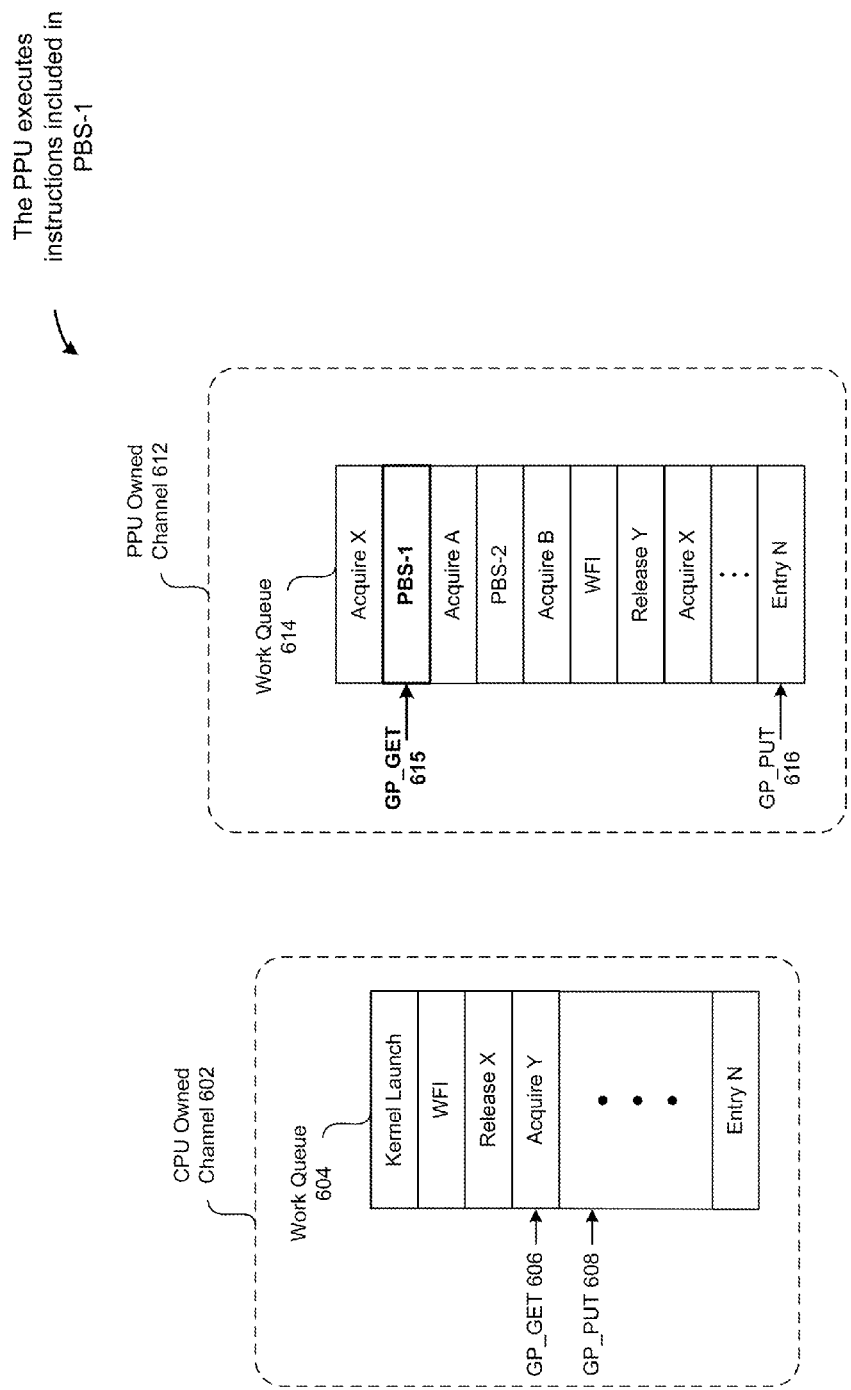

FIGS. 6A-6F illustrate an example interaction between two different channels that enable work to be locally generated and executed within one of the PPUs 202, according to one embodiment of the present invention. As shown in FIG. 6A, a CPU-owned channel 602 includes a work queue 604 that includes a plurality of entries, a GP_GET pointer 606 and a GP_PUT pointer 608. The CPU-owned channel 602 represents a channel through which the CPU 102 is able to cause the PPU 202 to execute work. In this example, the work included in the kernel launch causes additional work to be generated within the PPU 202 and executed within the PPU 202 according to the techniques described herein.

In FIG. 6A, the GP_GET pointer 606 points to a kernel launch that includes references to functions within a particular API supported by device driver 103 that enables a developer to indicate to host interface 206 that the work request, when executed, will cause one or more threads executing on the PPU 202 to locally generate additional (i.e., nested work) that is to be executed by the PPU 202. The device driver 103 initializes a PPU-owned channel 612—illustrated in FIG. 6B—according to the techniques described above in conjunction with FIG. 4A.

As shown in FIG. 6B, the PPU-owned channel 612 includes a plurality of entries, which include an "Acquire X" entry that is unblocked when the "Release X" entry within the CPU-owned channel 602 is pointed to the GP_GET 606. Also shown in FIG. 6B is GP_PUT 616, which has been set to point to a last entry of the work queue 614 to establish a range of entries into which the threads can insert new work to be executed. Also shown in FIG. 6B is a first command block ("PBS-1"), which is followed by an "Acquire A" semaphore entry that is unblocked by the thread when the thread that generates "PBS-2" indicates that no additional work will be generated by the thread. The PPU-owned channel 612 also includes a second command block ("PBS-2"), which is followed by an "Acquire B" semaphore entry that is unblocked when a thread determines that no additional work needs to be generated and performs step 468.

FIG. 6C illustrates the release of semaphore X within the CPU-owned channel 602, which occurs at step 416 of FIG. 4A and causes the GP_GET pointer 615 to move to the next entry in work queue 614, i.e., PBS-1. FIG. 6D illustrates execution of the work included in PBS-1. Semaphore A is released when the thread that generated PBS-2 indicates that PBS-2 has been completely inserted into the work queue, after which Host Interface 206 advances GP_GET to point to the entry containing PBS-2. FIG. 6E illustrates the execution of the work included in PBS-2. Finally, semaphore B is released when a thread determines that no more work will be generated and performs step 468. The events illustrated in both FIGS. 6D and 6E represent method steps 464-466 of method 450 described above. Finally, FIG. 6F illustrates the release of semaphore Y, which causes control to be returned back to the CPU-owned channel 602. In particular, FIG. 6F illustrates step 470 of method 450 described above.

In combination, disclosed embodiments of the present invention enable threads executing on a PPU 202 to locally generate and execute work within the PPU 202 by way of a PPU 202-owned work queue and command blocks. The GP_GET and GP_PUT pointers of the PPU 202-owned work queue are set by the device driver 103 to create a range of entries within the PPU 202-owned work queue into which the threads can directly insert new work for execution, where the work is stored in command blocks pointed to by entries of the PPU 202-owned work queue. The threads also point entries in the PPU 202-owned work queue to semaphores to prevent GP_GET from advancing through the PPU 202-owned work queue and executing work included therein prior to the threads completing their generation of work.

One advantage of the disclosed embodiments is that the threads executing on the PPU 202 can create nested work within the PPU 202 without needing to issue requests to the CPU 102 to do so. As a result, less bandwidth is consumed across the communication path 113, and, further, the workload of the CPU 102 is reduced, thereby increasing efficiency. Moreover, the threads are capable of executing useful nested work without relying on the CPU 102 for authorization or having to wait for the CPU 102 to respond to a request to execute the nested work.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

We claim:

1. A method for configuring a work queue to enable threads executing in a parallel processing subsystem to generate and execute work within the parallel processing subsystem, the method comprising:
generating the work queue, wherein the work queue includes a plurality of entries and is associated with a first pointer and a second pointer, wherein each of the first pointer and the second pointer is inaccessible to the threads;
establishing a range of free entries in the work queue by:
pointing the first pointer to a first entry of the plurality of entries; and
pointing the second pointer to a last entry of the plurality of entries;
generating a third pointer that points to the first entry of the plurality of entries, wherein the third pointer is accessible to the threads;
generating a fourth pointer that points to the last entry of the plurality of entries, wherein the fourth pointer is accessible to the threads;
pointing the first entry of the work queue to a command block that contains a semaphore acquire command pointing to a semaphore that is blocked;
loading work into the range of free entries in the work queue via the third and fourth pointers; and
in response to determining that the threads have completed loading work into the range of free entries in the work queue, releasing the semaphore to cause both the first pointer to advance to a next entry in the work queue and to cause the parallel processing subsystem to execute work generated by the threads.

2. The method of claim 1, wherein both the first pointer and the second pointer comprise Peripheral Component Interconnect Express (PCI-E)-based pointers.

3. The method of claim 1, wherein both the third pointer and the fourth pointer are stored in an area of a memory included in the parallel processing subsystem that is accessible to the threads.

4. The method of claim 1, wherein releasing the first semaphore comprises writing a value into an area of memory to which the first semaphore is directed.

5. The method of claim 1, wherein the work queue is generated in response to detecting that the threads are referencing one or more application programming interface (API) functions that are directed to generating and executing work within the parallel processing subsystem.

6. The method of claim 1, wherein each entry in the work queue is configured to point to a command block.

7. The method of claim 1, wherein each command block is configured to store either instructions or commands that are executable by the parallel processing subsystem.

8. A non-transitory computer-readable storage medium storing instructions that, when executed by a processor, cause the processor to configure a work queue to enable threads executing in a parallel processing subsystem to generate and execute work within the parallel processing subsystem, by performing the steps of:
generating the work queue, wherein the work queue includes a plurality of entries and is associated with a first pointer and a second pointer, wherein each of the first pointer and the second pointer is inaccessible to the threads;

establishing a range of free entries in the work queue by:
  pointing the first pointer to a first entry of the plurality of entries; and
  pointing the second pointer to a last entry of the plurality of entries;

generating a third pointer that points to the first entry of the plurality of entries, wherein the third pointer is accessible to the threads;

generating a fourth pointer that points to the last entry of the plurality of entries, wherein the fourth pointer is accessible to the threads;

pointing the first entry of the work queue to a command block that contains a semaphore acquire command pointing to a semaphore that is blocked;

loading work into the range of free entries in the work queue via the third and fourth pointers;

in response to determining that the threads have completed loading work into the range of free entries in the work queue, and releasing the semaphore to cause both the first pointer to advance to a next entry in the work queue and to cause the parallel processing subsystem to execute work generated by the threads.

9. The non-transitory computer-readable storage medium of claim 8, wherein both the first pointer and the second pointer comprise Peripheral Component Interconnect Express (PCI-E)-based pointers.

10. The non-transitory computer-readable storage medium of claim 8, wherein both the third pointer and the fourth pointer are stored in an area of a memory included in the parallel processing subsystem that is accessible to the threads.

11. The non-transitory computer-readable storage medium of claim 8, wherein releasing the first semaphore comprises writing a value into an area of memory to which the first semaphore is directed.

12. The non-transitory computer-readable storage medium of claim 8, wherein the work queue is generated in response to detecting that the threads are referencing one or more application programming interface (API) functions that are directed to generating and executing work within the parallel processing subsystem.

13. The non-transitory computer-readable storage medium of claim 8, wherein each entry in the work queue is configured to point to a command block.

14. The non-transitory computer-readable storage medium of claim 8, wherein each command block is configured to store either instructions or commands that are executable by the parallel processing subsystem.

15. A parallel processing subsystem that includes a work queue that enables threads executing in the parallel processing subsystem to generate and execute work within the parallel processing subsystem, the parallel processing subsystem comprising:
  at least one processor configured to execute the threads; and
  a driver that interfaces with the at least one processor, wherein the driver is configured to:
    generate the work queue, wherein the work queue includes a plurality of entries and is associated with a first pointer and a second pointer, wherein each of the first pointer and the second pointer is inaccessible to the threads;
    establish a range of free entries in the work queue by:
      pointing the first pointer to a first entry of the plurality of entries; and
      pointing the second pointer to a last entry of the plurality of entries;
    generate a third pointer that points to the first entry of the plurality of entries, wherein the third pointer is accessible to the threads;
    generate a fourth pointer that points to the last entry of the plurality of entries, wherein the fourth pointer is accessible to the threads;
    point the first entry of the work queue to a command block that contains a semaphore acquire command pointing to a semaphore that is blocked;
    load work into the range of free entries in the work queue via the third and fourth pointers;
    in response to determining that the threads have completed loading work into the range of free entries in the work queue, release the semaphore to cause both the first pointer to advance to a next entry in the work queue and to cause the parallel processing subsystem to execute work generated by the threads.

16. The parallel processing subsystem of claim 15, wherein both the first pointer and the second pointer comprise Peripheral Component Interconnect Express (PCI-E)-based pointers.

17. The parallel processing subsystem of claim 15, wherein both the third pointer and the fourth pointer are stored in an area of a memory included in the parallel processing subsystem that is accessible to the threads.

18. The parallel processing subsystem of claim 15, wherein releasing the first semaphore comprises writing a value into an area of memory to which the first semaphore is directed.

19. The parallel processing subsystem of claim 15, wherein the work queue is generated in response to detecting that the threads are referencing one or more application programming interface (API) functions that are directed to generating and executing work within the parallel processing subsystem.

20. The parallel processing subsystem of claim 15, wherein each entry in the work queue is configured to point to a command block.

* * * * *

UNITED STATES PATENT AND TRADEMARK OFFICE
CERTIFICATE OF CORRECTION

| | | |
|---|---|---|
| PATENT NO. | : 9,135,081 B2 | Page 1 of 1 |
| APPLICATION NO. | : 13/662274 | |
| DATED | : September 15, 2015 | |
| INVENTOR(S) | : Llamas et al. | |

It is certified that error appears in the above-identified patent and that said Letters Patent is hereby corrected as shown below:

In the Claims
Column 19, Line 23, Claim 8, please delete "and".

Signed and Sealed this
Twenty-sixth Day of April, 2016

Michelle K. Lee
*Director of the United States Patent and Trademark Office*